United States Patent [19]

Herlacher

[11] 4,002,857

[45] Jan. 11, 1977

[54] TELEPHONE CIRCUIT TO ELIMINATE USE OF A HOLD BUTTON

[75] Inventor: Richard Eugene Herlacher, Camp Hill, Pa.

[73] Assignee: International Telephone and Telegraph Corporation, Nutley, N.J.

[22] Filed: Dec. 16, 1975

[21] Appl. No.: 641,201

[52] U.S. Cl. .............................. 179/99; 179/1 CN
[51] Int. Cl.² ..................... H04M 1/72; H04M 3/56
[58] Field of Search ........ 179/1 CN, 1 H, 99, 81 A, 179/18 BC

[56] References Cited

UNITED STATES PATENTS

| | | | |
|---|---|---|---|
| 3,423,532 | 1/1969 | Coel et al. | 179/1 CN |
| 3,515,807 | 6/1970 | Clark | 179/1 CN |
| 3,725,601 | 3/1973 | Jetzt et al. | 179/99 |
| 3,819,871 | 6/1974 | Verdon | 179/99 |

Primary Examiner—Kathleen H. Claffy
Assistant Examiner—Randall P. Myers
Attorney, Agent, or Firm—John T. O'Halloran; Alfred C. Hill

[57] ABSTRACT

A circuit arrangement to enable one party to have a two-way conversation simultaneously with an outside party and an internal party. The circuit arrangement includes circuitry so that the outside party cannot hear anything that is said by the internal party or vice versa. Thus, the one party has the ability to talk to both the outside and the internal party without them hearing each other while using one subset and not putting anyone on hold. The circuitry is also provided with a designated button, which when depressed places all three parties in a two-way conference. In addition, the circuitry includes a resistance network coupled between the transmitter and receiver of the one subset both in the outside circuit and the internal circuit associated therewith to reduce sidetones in the receiver of the one subset.

11 Claims, 2 Drawing Figures

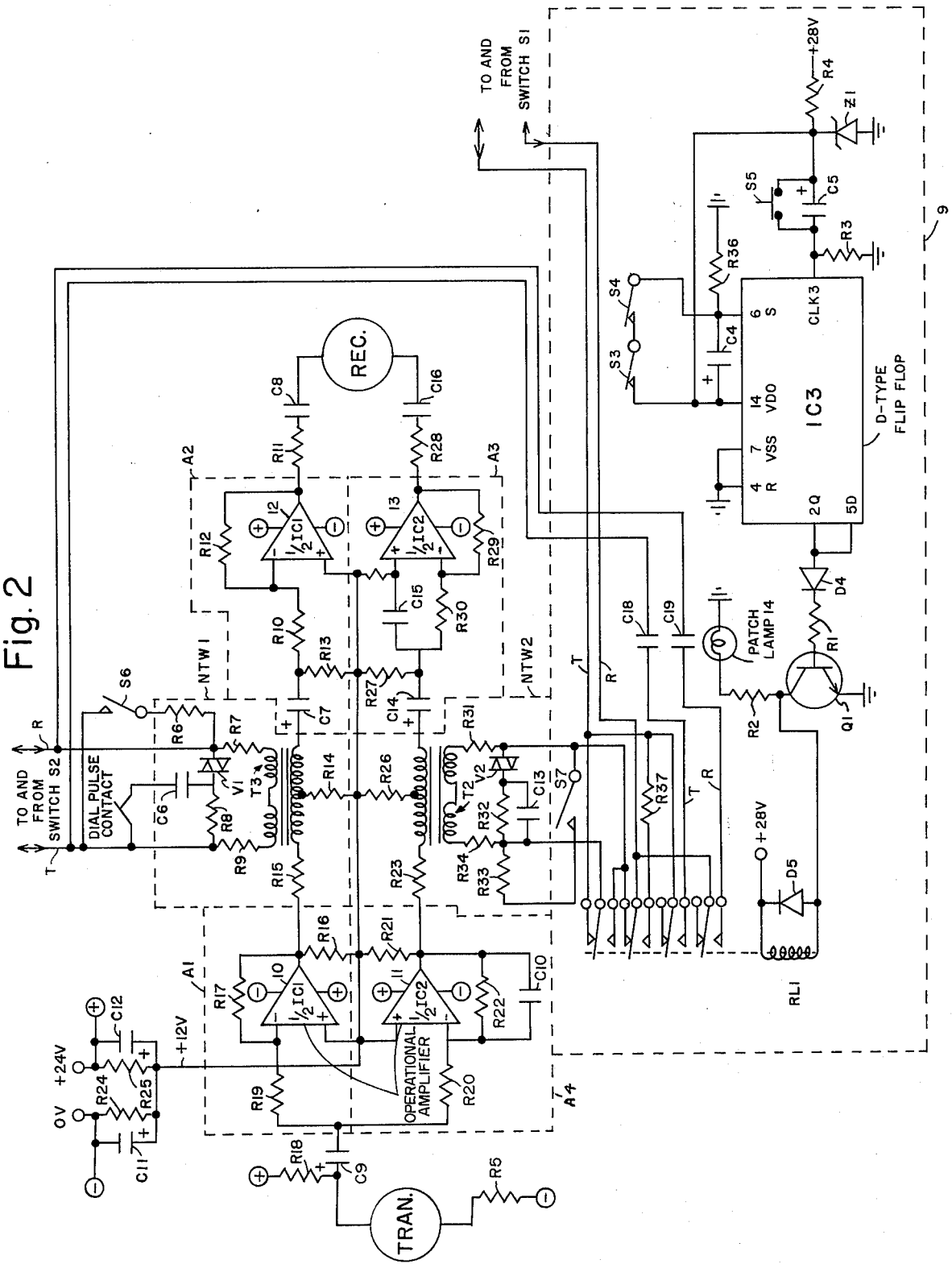

TELEPHONE CIRCUIT TO ELIMINATE USE OF A HOLD BUTTON

BACKGROUND OF THE INVENTION

This invention relates to telephone systems and more particularly to telephone circuits employing key telephone systems.

Existing key telephone systems having the capabilities for outside as well as internal communications require the use of two subsets or placing the outside call on hold while the internal call is conducted. In either case, this requires depressing many buttons or manipulating several subsets to perform the desired operation.

There are several shortcomings to the above operating procedures. If the two subset approach is used, there is always the inconvenience of holding the two subsets. If the single subset is used in conjunction with the hold button, the outside party who is calling for some type of assistance does not have the assurance that anything is being done to solve his problems since he does not hear any part of the conversation that transpires internally.

A solution to this problem is disclosed in my copending application Ser. No. 622,287, filed Oct. 10, 1975. A circuit arrangement is disclosed in this copending application that will enable one party to have a two-way conversation simultaneously with an outside party and an internal party without the outside party and inside party hearing each other. A button is provided to actuate circuitry in the circuit arrangement to place all three parties in a two-way conference.

One disadvantage with the circuit arrangement of this copending application is that the sidetones in the receiver of the subset of the one party is undesirably high.

SUMMARY OF THE INVENTION

An object of the present invention is to provide a telephone circuit at the subset of the one party which results in reduced sidetones in the subset receiver relative to those sidetones present in the circuit arrangement of the above cited copending application.

As in the case of the circuit arrangement of the above cited copending application the new telephone circuit does not require the use of two subsets and it does not require the use of the hold button. When this new telephone circuit is used, one party using the new telephone circuit using one handset is able to have a two-way conversation with the outside party as well as with the internal party. At the same time, the outside party cannot hear anything that is said by the internal party or vice versa. In short, this gives the party employing the new telephone circuit the ability to talk to both parties without them hearing each other while using one handset and not putting anyone on hold. As an additional benefit, by depressing a designated button all three parties can be put into a two-way conference. A further benefit is that the sidetones in the receiver of the subset employing the new telephone circuit is reduced.

A feature of the present invention is the provision of a telephone circuit to eliminate use of a hold button comprising: a subset having a receiver and a transmitter for use by one party; a plurality of central office lines connected to outside parties; a plurality of internal lines connected to internal parties; first means to couple the receiver and the transmitter to a selected one of the central office lines to enable a first two-way conversation between the one party and a selected one of the outside parties, the first means including a first network coupled between the transmitter and the receiver to reduce sidetones in the receiver; second means to couple the receiver and the transmitter to a selected one of the internal lines to enable a second two-way conversation between the one party and a selected one of the internal parties, the second means including a second network coupled between the transmitter and the receiver to reduce sidetones in the receiver; and third means coupled between the input of the first and the input of the second means, the third means having a first state to enable the first and second conversations to be carried on simultaneously and to prevent the selected one of the outside parties and the selected one of the internal parties from hearing each other and a second state to selectively enable the one party, the selected one of the outside parties and the selected one of the internal parties to be placed in a two-way conference.

BRIEF DESCRIPTION OF THE DRAWING

Above-mentioned and other features and objects of this invention will become more apparent by reference to the following description taken in conjunction with the accompanying drawing, in which:

FIG. 2 is a schematic diagram partially in block form of the impedance matching networks, transmitter and receiver isolation amplifiers and patch unit of FIG. 1 in accordance with the principles of the present invention.

DESCRIPTION OF THE PREFERRED EMBODIMENT

Figure 1:
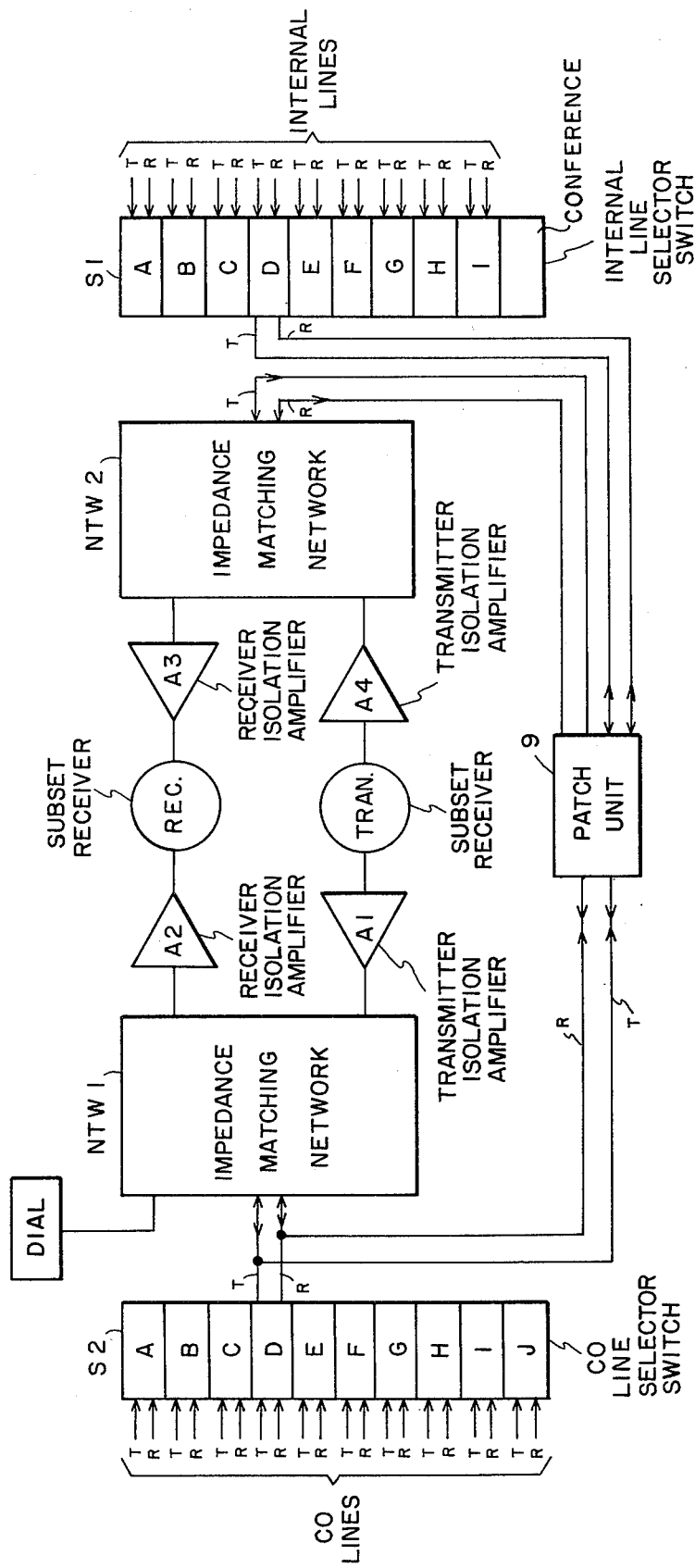
FIG. 1 is a block diagram of the telephone circuit in accordance with the principles of the present invention.

Referring to FIG. 1, when a call comes in from outside on the CO (Central Office) lines, the signal is connected to an impedance matching network NTW1 by depressing the proper one of flashing buttons A–S of the CO line selector switch S2. Network NTW1 contains all of the components necessary to match the impedances of the transmitter and receiver to the selected CO line. The received signal at the receive part of network NTW1 passes through isolation amplifier A2 to the subset receiver REC. The signal from the subset transmitter TRANS passes through isolation amplifier A1 back to network NTW1, thus completing the connection to an outside or CO line.

If at this same time it is desired to also talk to an internal party, the desired internal line is selected by depressing the appropriate one of buttons A-I on internal line selector switch S1. The transmitter signal of the subset goes through the isolation amplifier A4 to an impedance matching network NTW2 and then through internal line selector switch S1 to the selected internal line. Network NTW2 contains all the components necessary to match the impedances of the subset transmitter and receiver to the selected internal line. The received signal comes in through select switch S1 through network NTW2 and through isolation amplifier A3 to the subset receiver REC. In this condition, the party employing the subset can hold a two-way conversation with both the external and internal parties, but the internal party cannot hear the outside party and vice versa.

If it is desired to patch all three parties together for a conference, this can be done by depressing the patch button on selector switch S1 and all parties are connected together via the patch unit 9, impedance matching network NTW1 and isolation amplifiers A1 and A2.

Referring to FIG. 2, the impedance matching network NTW1 and NTW2 will be described. Transformer T3 and resistors R7 and R9 provide the proper match and isolation to the incoming external telephone circuit from switch S2 including tip (T) and ring (R) conductors. The varistor V1 changes resistance inversely to the current flowing through it, thereby helping to keep the looses over a long and short loop the same. Resistor R8 and capacitor C6 provide a filter network to suppress high frequency signal components of the dial pulses. Resistor R6 through switch S6 provides a load for network NTW1 when there is no CO line connected thereto by selector switch S2. Switch S6 is coupled to the pushbutton switches of selector switch S2 and is open when one pushbutton switch is depressed to couple a selected CO line to network NTW1 and is closed when none of the pushbutton switches are depressed.

Transformer T2, resistors R31, R32, R33 and R34, capacitor C13, varistor V2 and switch S7 perform the identical functions as above for the internal telephone circuit.

The transmit circuit will now be described with reference to FIG. 2. Resistors R5 and R18 provide DC (direct current) current to operate the transmitter TRAN. Capacitor C9 couples the signal from transmitter TRAN into operational amplfiers 10 and 11. Operational amplifiers 10 and 11 are operated with differential inputs in order to reduce the amplification of a common mode signal. Resistors R17 and R19 and resistors R20 and R22 determine the gain of amplifiers 10 and 11, respectively. Capacitor C10 shunting resistor R22 helps to reduce the high frequency response on the internal circuit. Resistors R16 and R21 provide loads on amplifiers 10 and 11, respectively. Resistors R14 and R15 and resistors R23 and R26 in conjunction with transformers T3 and T2 provide the proper impedance load for the transmit operational amplifiers 10 and 11, respectively. Resistors R14 and R26 along with the transformers T3 and T2 help to reduce the available signal going into receive amplifiers A2 and A3 from the transmit amplifiers 10 and 11, respectively, thereby reducing side-tones in the receiver REC.

The receive circuit will now be described with reference to FIG. 2. The receive signals pass through transformers T3 and T2 and then through capacitors C7 and C14 to their respective receive amplifiers A2 and A3. Amplifiers A2 and A3 include operational amplifiers 12 and 13, respectively. Operational amplifiers 12 and 13 are operated with differential inputs in order to reduce the amplification of a common mode signal. Resistors R13 and R27 maintain the necessary load on the input transformers T3 and T2, respectively. Resistors R10 and R12 determine the gain of the external receive operational amplifier 12. Resistors R29, R30 and R35 and capacitor C15 determine the gain of the internal receive operational amplifier 13 and also provide some phase shift so that the external and internal signals are in phase. Resistors R11 and R28 and capacitors C8 and C16 provide impedance match and DC isolation for receiver REC which is connected across the output of operational amplifiers 12 and 13.

Resistors R24 and R25 and capacitors C11 and C12 provide a filtered plus and minus 12 volts to power operational amplifiers 10 – 13 and also provides a +12 volts reference potential which is coupled to operational amplifiers 10–13 and the resistor circuits associated therewith.

Patch unit 9 will now be discussed with reference to FIG. 2. Patch unit 9 includes a CMOS (clad metal oxide semiconductor) D-type flip flop IC3 which is used to convert the momentary action conference switch S5 located in selector switch S1 (FIG. 1) into an alternate action switch to control the patch relay RL1. Resistors R3 and capacitor C5 provide an RC (resistor capacitor) circuit to debounce momentary conference switch S5. Resistor R4 and zener diode Z1 provide a regulated 10 volts DC for flip flop IC3 from the 28 volts DC supply. Any time a positive going pulse is pesent at pin 3 of flip flop IC3, the output at pins 2 and 5 of flip flop IC3 will change state. Resistor R36 and capacitor C4 provide an RC time constant to debounce the reset switches S3 and S4 located on the ends of line selector switches S1 and S2 (FIG. 1). Any time a positive pulse is present at pin 6 of flip flop IC3, flip flop IC3 is reset and patch unit 9 is turned off. The positive pulse at pin 6 of flip flop IC3 is present when both reset switches S3 and S4 are closed. Diode D4 suppresses any spikes present going into the switching transistor Q1. Resistor R1 limits current into transistor Q1. Transistor Q1 switches relay RL1 and the patch lamp 14 on when the output of flip flop IC3 is high (binary 1) and off when the output of flip flop IC3 is low (binary 0). Diode D5 provides spike protection for relay RL1. Resistor R2 reduces the +28 volts DC to 10 volts DC to illuminate lamp 14. The contacts of relay RL1 when relay RL1 is inoperative, which is the first state of patch unit 9, connects the internal tip (T) and ring (R) conductors directly to network NTW2. The contacts of relay RL1 when relay RL1 is actuated, which is the second state of patch unit 9, connects the internal tip (T) and ring (R) conductors to the outside of external tip (T) and ring (R) conductors through capacitors C18 and C19, respectively, for DC isolation and also disables NTW2. Resistor R37 provides a load for the internal lines when patch unit 9 is in its second state. When patch unit 9 is in its second state a two-way conference for the three parties is possible since the external lines and internal lines are connected together and also to the input of network NTW1 which is still operative when patch unit 9 is in its second state.

The values and types of the components employed in FIG. 2 of a successful reduction to practice are set forth hereinbelow.

| R1 | 4.7K ¼ watt resistor |
|---|---|
| R2 | 390 ohm ½ watt resistor |
| R3, R16, R21 | 1K ¼ watt resistor |
| R4 | 2.2K ½ watt resistor |
| R5, R18 | 560 ohms 1 watt resistor |
| R6 | 330 ohms ½ watt resistor |
| R7, R9, R31, R34 | 150 ohms ½ watt resistor |
| R8, R32 | 180 ohms ½ watt resistor |
| R10, R22 | 33K ¼ watt resistor |
| R11, R14, R28 | 100 ohms ¼ watt resistor |
| R12 | 47K ¼ watt resistor |
| R13, R15, R23, R27 | 390 ohms ¼ watt resistor |
| R17 | 68K ¼ watt resistor |
| R19 | 3.9K ¼ watt resistor |
| R20 | 3.3K ¼ watt resistor |
| R24, R25 | 1.5K ½ watt resistor |
| R26 | 120 ohms ¼ watt resistor |
| R29, R30 | 100K ¼ watt resistor |
| R33 | 680 ohms ¼ watt resistor |

-continued

| | |
|---|---|
| R35, R36 | 10K ¼ watt resistor |
| R37 | 1K ½ watt resistor |
| C4, C7, C14 | 6.4 mfd 40V capacitor |
| C5 | 1.0 mfd 50V capacitor |
| C6, C9, C13 | .12 mfd 200V capacitor |
| C8, C11, C12, C16 | 50 mfd 35V capacitor |
| C10, C15 | .001 mfd 1KV capacitor |
| C18, C19 | 10 ufd, N.P. capacitor |
| D4, D5 | GR22 diode |
| Z1 | 10V 1 watt zener diode |
| V1, V2 | Varistor |
| IC1, IC2 | LM 1458 integrated circuit |
| IC3 | CA4013 dual D flip flop |
| Q1 | 2N3568 transistor |
| RL1 | 4PDT relay |
| T2, T3 | Transformer |

While I have described above the principles of my invention in connection with specific apparatus it is to be clearly understood that this description is made only by way of example and not as a limitation to the scope of my invention as set forth in the objects thereof and in the accompanying claims.

I claim:

1. A telephone circuit to eliminate use of a hold button comprising:
   a subset having a receiver and a transmitter for use by one party;
   a plurality of central office lines connected to outside parties;
   a plurality of internal lines connected to internal parties;
   first means to couple said receiver and said transmitter to a selected one of said central office lines to enable a first two-way conversation between said one party and a selected one of said outside parties, said first means including a first network coupled between said transmitter and said receiver to reduce sidetones in said receiver;
   second means to couple said receiver and said transmitter to a selected one of said internal lines to enable a second two-way conversation between said one party and a selected one of said internal parties, said second means including a second network coupled between said transmitter and said receiver to reduce sidetones in said receiver; and
   third means coupled between said first means and said second means, said third means having a first state to enable said first and second conversations to be carried on simultaneously and to prevent said selected one of said outside parties and said selected one of said internal parties from hearing each other and a second state to selectively enable said one party, said selected one of said outside parties and said selected one of said internal parties to be placed in a two-way conference.

2. A circuit according to claim 1, wherein said first means includes
   a line selector switch coupled to said plurality of central office lines to enable selection of said selected one of said central office lines,
   an impedance matching network coupled to said line selector switch,
   said impedance matching network having
   a transformer,
   a receiver isolation amplifier having at least one input coupled to one terminal of one winding of said transformer and its output coupled to said receiver,
   a transmitter isolation amplifier having at least one input coupled to said transmitter,
   a first resistor coupled between the other terminal of said one winding of said transformer and the output of said transmitter isolation amplifier, and
   said first network having
   a reference potential, and
   a second resistor coupled between a point on said one winding of said transformer intermediate said one and said other terminals of said one winding of said transformer and said reference potential.

3. A circuit according to claim 2, wherein each of said receiver isolation amplifier and said transmitter isolation amplifier includes
   an operational amplifier with differential inputs to reduce the amplification of a common mode signal.

4. A circuit according to claim 1, wherein said second means includes
   a line selector switch coupled to said plurality of internal lines to enable selection of said selected one of said internal lines,
   an impedance matching network coupled to said line selector swtich, through said third means
   said impedance matching network having
   a transformer
   a receiver isolation amplifier having at least one input coupled to one terminal of one winding of said transformer and its output coupled to said receiver,
   a transmitter isolation amplifier having at least one input coupled to said transmitter,
   a first resistor coupled between the other terminal of said one winding of said transformer and the output of said transmitter isolation amplifier, and
   said second network having
   a reference potential, and
   a second resistor coupled between a point on said one winding of said transformer intermediate said one and said other terminals of said one winding of said transformer and said reference potential.

5. A circuit according to claim 4, wherein each of said receiver isolation amplifier and said transmitter isolation amplifier includes
   an operational amplifier with differential inputs to reduce the amplification of a common mode signal.

6. A circuit according to claim 1, wherein said third means includes
   a source of direct current voltage,
   a momentary action switch coupled to said source,
   a D-type flip flop having a D terminal, a Q terminal and a clock terminal, said clock terminal being coupled to said switch, and
   a relay coupled to said D and Q terminals, said relay preventing connection of said selected one of said central office lines to said selected one of said internal lines during said first state of said third means and interconnecting said selected one of said central office lines and said selected one of said internal lines when the output signal of said D and Q terminal is high during said second state of said third means.

7. A circuit according to claim 1, wherein said first means includes a first line selector switch coupled to said plurality of central office lines to enable selection of said selected one of said central office lines, a first impedance matching network coupled to said first line selector switch, said first impedance matching network having a first transformer, a first receiver isolation amplifier having at least one input coupled to one terminal of one winding of said first transformer and its output coupled to said receiver, a first transmitter isolation amplifier having at least one input coupled to said transmitter, a first resistor coupled between the other terminal of said one winding of said first transformer and the output of said first transmitter isolation amplifier, and said first network includes a reference potential, and a second resistor coupled between a point on said one winding of said first transformer intermediate said one and said other terminals of said one winding of said first transformer and said reference potential; and said second means includes a second line selector switch coupled to said plurality of internal lines to enable selection of said selected one of said internal lines, a second impedance matching network coupled to said second line selector switch, through said third means said second impedance matching network including a second transformer, a second receiver isolation amplifier having at least one input coupled to one terminal of one winding of said second transformer and its output coupled to said receiver, a second transmitter isolation amplifier having at least one input coupled to said transmitter, a third resistor coupled between the other terminal of said one winding of said second transformer and the output of said second transmitter isolation amplifier, and said second network having a fourth resistor coupled between a point on said one winding of said second transformer intermediate said one and said other terminals of said one winding of said second transformer and said reference potential.

8. A circuit according to claim 7, wherein each of said first and second receiver isolation amplifiers and said first and second transmitter isolation amplifiers includes an operational amplifier with differential inputs to reduce the amplification of a common mode signal.

9. A circuit according to claim 7, wherein said third means is connected between the output of said first and second line selector switches and to the input of said second impedance matching network.

10. A circuit according to claim 9, wherein said third means includes a source of direct current voltage, a momentary action switch coupled to said source, a D-type flip flop having a D terminal, a Q terminal and a clock terminal, said clock terminal being coupled to said momentary action switch, and a relay coupled to said D and Q terminals, said relay preventing connection of said selected one of said central office lines to said selected one of said internal lines during said first state of said third means and interconnecting said selected one of said central office lines to said selected one of said internal lines when the output signal of said D and Q terminals is high during said second state of said third means.

11. A circuit according to claim 10, wherein each of said first and second receiver isolation amplifiers and said first and second transmitter isolation amplifiers includes an operational amplifier with differential inputs to reduce the amplification of a common mode signal.

* * * * *